W. NORTHROP.
METHOD FOR SHELLING PEAS AND LIKE VEGETABLE MATTERS.
APPLICATION FILED JULY 14, 1911.
1,118,673.
Patented Nov. 24, 1914.
2 SHEETS—SHEET 1.
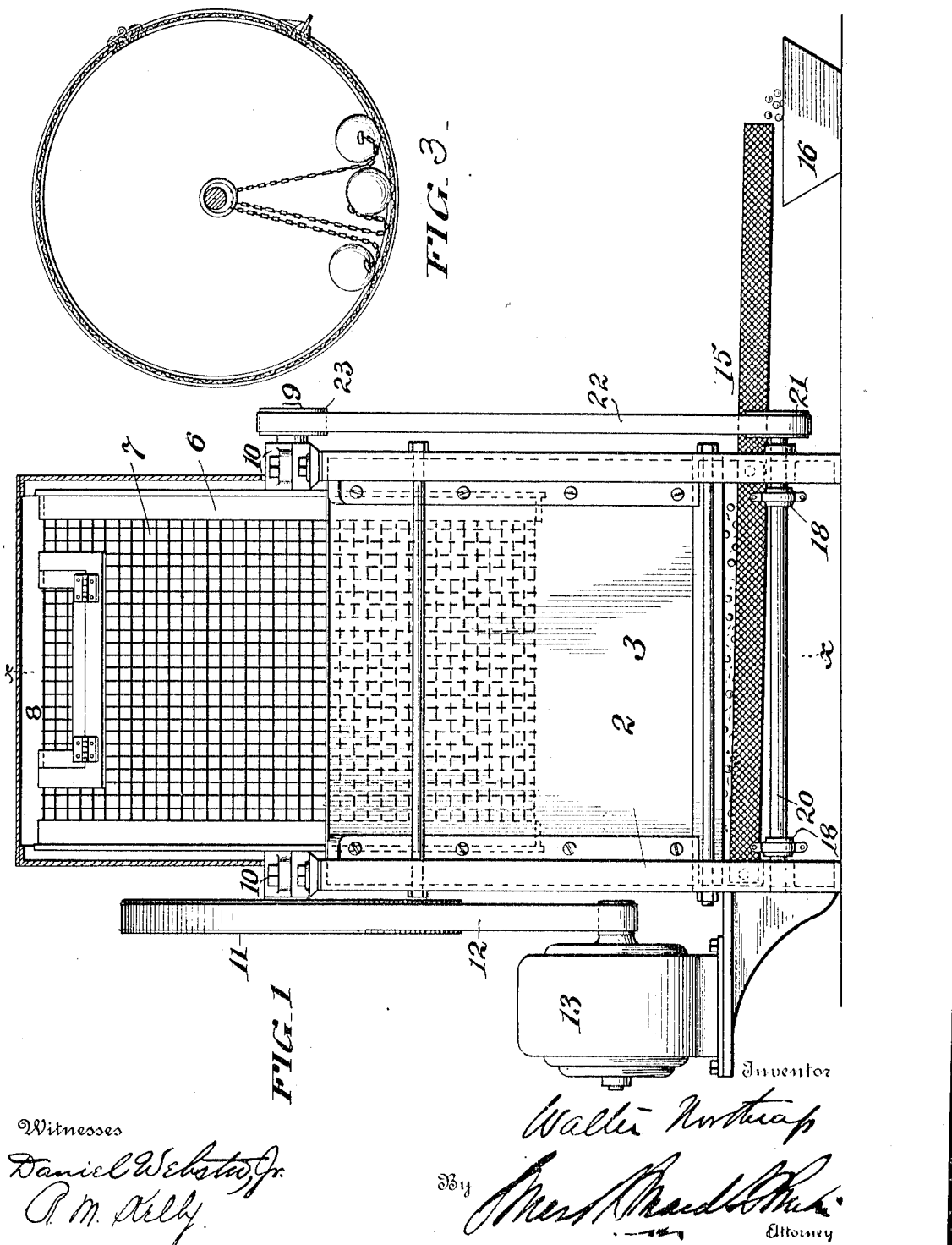

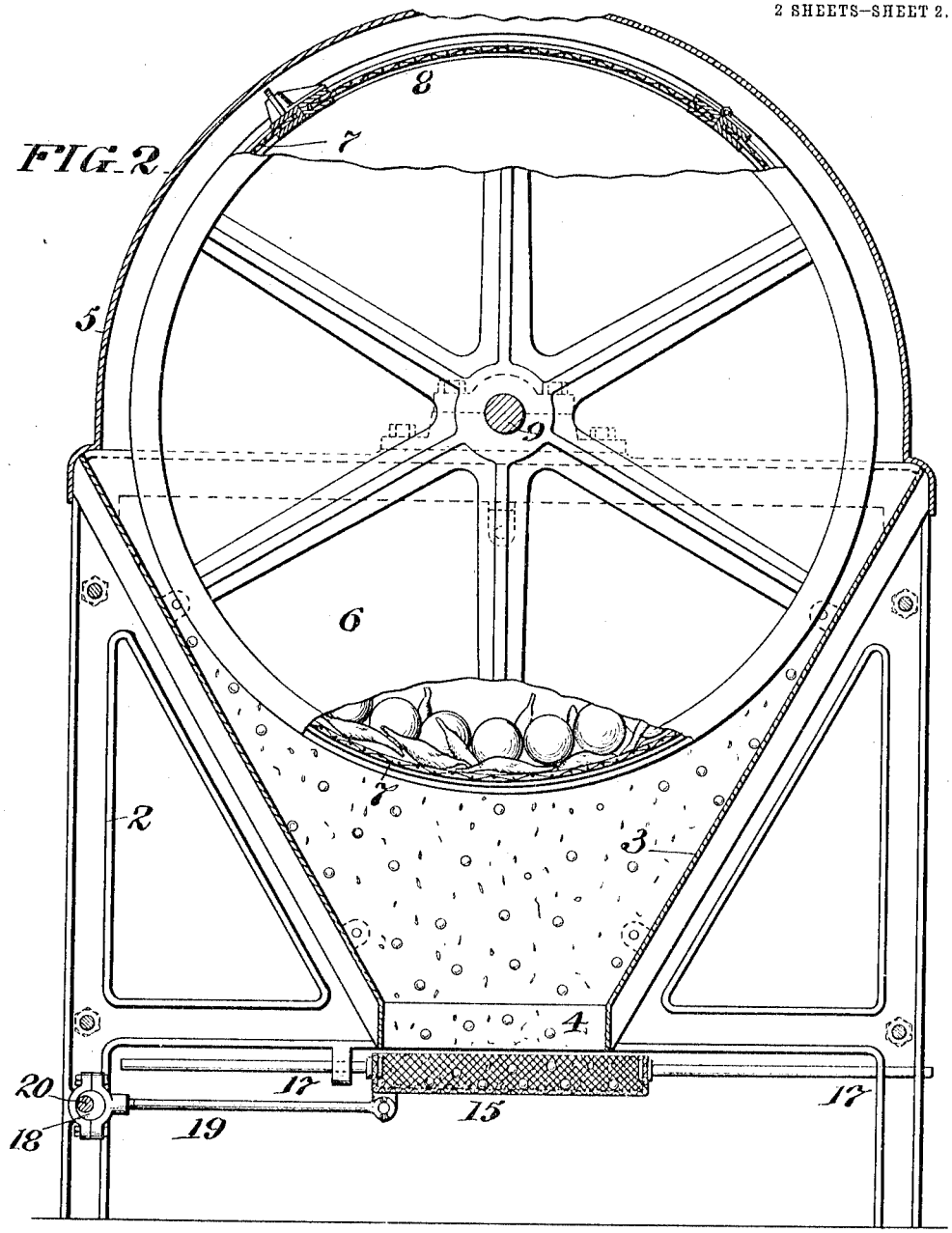

UNITED STATES PATENT OFFICE.

WALTER NORTHROP, OF HOPEDALE, MASSACHUSETTS, ASSIGNOR TO THE AMERICAN FRUIT MACHINERY COMPANY, A CORPORATION OF DELAWARE.

METHOD FOR SHELLING PEAS AND LIKE VEGETABLE MATTERS.

1,118,673.

Specification of Letters Patent.

Patented Nov. 24, 1914.

Application filed July 14, 1911. Serial No. 638,433.

*To all whom it may concern:*

Be it known that I, WALTER NORTHROP, a resident of Hopedale, in the county of Worcester and State of Massachusetts, have invented an Improvement in Methods for Shelling Peas and Like Vegetable Matters, of which the following is a specification.

My invention has reference to pea shelling machines, and consists of certain improvements which are fully set forth in the following specification and shown in the accompanying drawings which form a part thereof.

The object of my invention is to provide means for rapidly shelling peas from their pods, for use in hotels restaurants and similar places, where large quantities of peas are required to be prepared for use.

My invention consists of a rotatable compartment, having perforated or meshed circumference and containing a plurality of movable objects, such as balls of metal or other heavy material, which are free to move within the cylinder during its rotation, the peas being placed within the cylinder and during the rotation of the same subjected to pressure by the action of the balls or movable objects, whereby the peas are pressed out of the pods and passed through the perforated circumference of the cylinder while the pods are retained within the same.

My invention also consists of details of construction which, together with the features above specified, will be better understood by reference to the drawings in which:

Figure 1 is an elevation of my improved pea shelling machine; Fig. 2 is a sectional section of the same on line $x$—$x$; and Fig. 3 is a cross section of a modified construction of the cylinder and movable objects.

2 is the main frame of the machine and may be made in any suitable manner, being provided with a hopper 3, open at the bottom as at 4 and covered at the top with a removable hood 5.

6 is a cylindrical compartment having its ends closed, and its circumference formed with perforations in any suitable manner. As shown, the cylindrical body of this cylindrical compartment is preferably made of woven wire 7, which is clamped between the ends of the cylinder. This cylindrical compartment is provided with a door 8, for providing access to the interior thereof for the purpose of charging the same with the peas to be shelled and for removing the pods after the peas have been shelled. The cylindrical compartment is supported upon a shaft 9, journaled in bearings 10 on the main frame of the machine and in such position as to support the cylindrical compartment in the upper part of the hopper 3. The shaft 9, is provided with a band wheel 11, which may be rotated by a belt 12 leading to an electrical motor 13. The shaft and cylindrical compartment may be rotated in any other suitable manner, if so desired. When the machine is of large size, it is desirable that motive power shall be employed to rotate the cylinder, but in smaller machines the said cylinder may be rotated by hand.

Within the cylindrical compartment 6 I arrange a plurality of metal balls 14 which are free to roll about within the said cylindrical compartment and upon the contents thereof. When the peas are placed within the compartment through the door 8 and the cylinder is rotated, it is evident that these balls or moving objects, acting under the action of gravity during the rotation of the cylindrical compartment, will roll upon and press the peas from the pods, the said peas passing through the perforations or meshes in the cylindrical body of the compartment. The peas find their way downward through the hopper 3 while the pods are retained within the cylindrical compartment.

The peas from the hopper may be received directly in a receptacle of any suitable character, but I prefer to provide a vibrating trough shape structure 15$^a$, over which the peas will roll into a receptacle 16$^a$. The trough shape structure or conduit 15$^a$, is set on a slight incline and supported upon guides 17, so that it may be reciprocated laterally by means of eccentrics 18 and connections 19. The eccentrics are rotated by a shaft 20, having a band wheel 21, the said shaft being rapidly rotated by the belt 22, leading from a band wheel 23 or in any other suitable manner. During this lateral vibration of the trough shaped conduit, the peas will, by reason of being round, roll freely to the discharge end into the receptacle 16$^a$, whereas the dust and dirt or crushed pods will be screened through the interstices. In this manner, the peas are entirely separated from the pods, and broken portions thereof and other refuse.

When all of the peas have been shelled the cylindrical compartment may be brought to rest and the pods removed through the door 8.

If desired, the balls or objects 14, may be connected with the transverse shaft 9 by means of chains 15, attached at one end to the balls 14 and at the other end to a ring 16, which may be loosely threaded upon the shaft, as clearly shown in Fig. 3. In this modification, the balls are held captive, while the cylinder is free to rotate. It will be understood that the moving objects 14 may be of any suitable shape or construction, so long as they will act to press the peas out of the pods during the rotation of the cylindrical compartment. It is also to be understood that the cylindrical compartment may be of any suitable shape, provided it is furnished with apertures through which the peas may pass, said apertures being sufficiently small to prevent the pods passing therethrough.

While I have shown my invention in the form which I have adopted for commercial use, I do not restrict myself to the details thereof, as these may be modified without departing from the spirit of the invention.

Having now described my invention, what I claim as new and desire to secure by Letters Patent, is:

The herein described method for shelling peas and like vegetable matters, which consists in causing the shells or pods of the peas or similar vegetable matters to be burst by subjecting them to agitation and compression in a container by contact with freely movable impact elements with which they are commingled, whereby the peas or the like are pressed out of the containing pods, and separating the said liberated peas or the like from the pods by causing them to pass through the container while preventing the passage of the pods.

In testimony of which invention, I hereunto set my hand.

WALTER NORTHROP.

Witnesses:
M. L. WEINBERGER,
WM. C. C. MATHEWS.

Copies of this patent may be obtained for five cents each, by addressing the "Commissioner of Patents, Washington, D. C."